United States Patent
Hammerschmidt et al.

(10) Patent No.: US 8,346,813 B2
(45) Date of Patent: Jan. 1, 2013

(54) USING NODE IDENTIFIERS IN MATERIALIZED XML VIEWS AND INDEXES TO DIRECTLY NAVIGATE TO AND WITHIN XML FRAGMENTS

(75) Inventors: Beda Hammerschmidt, San Carlos, CA (US); Thomas Baby, Maple Valley, WA (US); Zhen Hua Liu, San Mateo, CA (US); Siddharth Patel, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 302 days.

(21) Appl. No.: 12/690,820

(22) Filed: Jan. 20, 2010

(65) Prior Publication Data

US 2011/0179085 A1    Jul. 21, 2011

(51) Int. Cl.
   *G06F 17/30*   (2006.01)
(52) U.S. Cl. ......... 707/797; 707/741; 707/796; 707/800
(58) Field of Classification Search .................. None
   See application file for complete search history.

(56) References Cited

U.S. PATENT DOCUMENTS

| | | | |
|---|---|---|---|
| 6,535,970 B1 | 3/2003 | Bills et al. | |
| 6,853,992 B2 | 2/2005 | Igata | |
| 7,162,485 B2 | 1/2007 | Gottlob et al. | |
| 7,281,206 B2 | 10/2007 | Schnelle et al. | |
| 7,366,735 B2 * | 4/2008 | Chandrasekar et al. | 1/1 |
| 7,499,915 B2 * | 3/2009 | Chandrasekar et al. | 1/1 |
| 7,680,764 B2 * | 3/2010 | Chandrasekar et al. | 707/999.002 |
| 7,734,631 B2 | 6/2010 | Richardson et al. | |
| 7,870,124 B2 * | 1/2011 | Liu et al. | 707/718 |
| 7,885,980 B2 * | 2/2011 | Tarachandani et al. | 707/802 |
| 7,917,515 B1 | 3/2011 | Lemoine | |
| 8,024,329 B1 | 9/2011 | Rennison | |
| 8,090,731 B2 | 1/2012 | Sthanikam et al. | |
| 2002/0116371 A1 | 8/2002 | Dodds et al. | |
| 2003/0182268 A1 | 9/2003 | Lal | |
| 2004/0006007 A1 | 1/2004 | Gosselin et al. | |
| 2005/0091188 A1 | 4/2005 | Pal et al. | |
| 2005/0228818 A1 | 10/2005 | Murthy et al. | |
| 2005/0228828 A1 * | 10/2005 | Chandrasekar et al. | 707/104.1 |

(Continued)

OTHER PUBLICATIONS

U.S. Appl. No. 12/610,047, filed Oct. 30, 2009, Notice of Allowance, May 4, 2012.

(Continued)

*Primary Examiner* — Debbie Le
(74) *Attorney, Agent, or Firm* — Hickman Palermo Truong Becker Bingham Wong LLP (57) ABSTRACT

A method and apparatus is provided for efficiently searching and navigating XML data stored in a relational database. When storing a collection of XML documents, certain scalar elements may be shredded and stored in a relational table, whereas unstructured data may be stored as a CLOB or BLOB column. The approach includes identifying a reference address to within an XML tree index entry and storing the address in an xmltable index. The tree index entry allows for navigation in all axes. A path-based expression may be evaluated in the context of the reference address of the LOB. The result of the evaluation identifies another XML tree index entry containing a LOB locator used to retrieve the content from the document. The tree index, node index, and secondary function indexes are used together to enhance the performance of querying the XML data.

18 Claims, 8 Drawing Sheets

U.S. PATENT DOCUMENTS

| | | | |
|---|---|---|---|
| 2005/0229158 A1 | 10/2005 | Thusoo et al. | |
| 2005/0289175 A1* | 12/2005 | Krishnaprasad et al. | 707/102 |
| 2006/0047646 A1 | 3/2006 | Maluf et al. | |
| 2006/0101320 A1 | 5/2006 | Dodds et al. | |
| 2006/0167928 A1* | 7/2006 | Chakraborty et al. | 707/102 |
| 2006/0212420 A1 | 9/2006 | Murthy et al. | |
| 2006/0242574 A1 | 10/2006 | Richardson et al. | |
| 2007/0016604 A1* | 1/2007 | Murthy et al. | 707/102 |
| 2007/0016605 A1 | 1/2007 | Murthy et al. | |
| 2007/0174309 A1 | 7/2007 | Pettovello | |
| 2007/0255748 A1 | 11/2007 | Ferragina et al. | |
| 2007/0299811 A1* | 12/2007 | Chandrasekar et al. | 707/2 |
| 2008/0059417 A1 | 3/2008 | Yamada et al. | |
| 2008/0114725 A1 | 5/2008 | Indeck et al. | |
| 2008/0215527 A1 | 9/2008 | Charlet et al. | |
| 2008/0301129 A1 | 12/2008 | Milward et al. | |
| 2009/0089263 A1 | 4/2009 | McHugh et al. | |
| 2009/0265339 A1 | 10/2009 | Chen et al. | |
| 2009/0288026 A1 | 11/2009 | Barabas et al. | |
| 2010/0169354 A1 | 7/2010 | Baby | |
| 2010/0185683 A1 | 7/2010 | Baby et al. | |
| 2010/0228781 A1 | 9/2010 | Fowler | |
| 2010/0312771 A1 | 12/2010 | Richardson et al. | |
| 2010/0332966 A1 | 12/2010 | Idicula et al. | |
| 2011/0106811 A1* | 5/2011 | Novoselsky et al. | 707/741 |
| 2011/0179085 A1 | 7/2011 | Hammerschmidt et al. | |
| 2011/0208730 A1 | 8/2011 | Jiang et al. | |
| 2012/0143919 A1 | 6/2012 | Idicula | |

OTHER PUBLICATIONS

U.S. Appl. No. 12/792,659, filed Jun. 2, 2010, Office Action, mailed May 16, 2012.

U.S. Appl. No. 12/871,869, filed Aug. 30, 2010, Office Action, mailed May 9, 2012.

U.S. Appl. No. 12/792,659, filed Jun. 2, 2010, Office Action, mailed Sep. 10, 2012.

* cited by examiner

XML document 100

```
<PurchaseOrder poDate= "July 20, 2009"
    <shipAddr>
        <city>San Mateo</city>
        <zipcode>94402</zipcode>
    </shipAddr>
    <lineItem>
        <name> PC </name>
        <price> $1300 </price>
        <quantity> 1 </quantity>
        <category> computer </category>
    </ lineItem >
    < lineItem >
        <name> printer </name>
        <price> $350 </price>
        <quantity> 2 </quantity>
        <category> peripherals </category>
    </ lineItem >
</PurchaseOrder>
```

FIG. 1A

```
<PurchaseOrder poDate= "November 8, 2009"
[elements deleted for purposes of example]
  <lineItem >
    <quantity> 2 </quantity>
    <description>This versatile printer can print in 3d or
    2d. Simply place an object in its scanning
    compartment, and it reproduce the object in one
    of several selectable materials. 3d fax available as
    an option. ...   </description>
    <name> printer </name>
    <price> $350 </price>
    <category> peripherals </category>
  </ lineItem >
  <lineItem> ...</lineItem>
  <lineItem> ...</lineItem>
  ...
</PurchaseOrder>
```

Xmltable index 600

| row id | Name 610 | Price 620 | 640<br>Description<br>(reference address) | 630<br>lineItem<br>(reference Address) |
|---|---|---|---|---|
| 1 | Printer | $350 | (3, 1) | (2,7) |
| | | | | |

USING NODE IDENTIFIERS IN MATERIALIZED XML VIEWS AND INDEXES TO DIRECTLY NAVIGATE TO AND WITHIN XML FRAGMENTS

RELATED APPLICATIONS

This application is related to the following patent applications, the content of which is incorporated by reference herein: U.S. patent application Ser. No. 12/610,047 filed on Oct. 30, 2009, entitled "Efficient XML Tree Indexing Structure over XML Content" and U.S. patent application Ser. No. 11/394,878 filed on Mar. 31, 2006, entitled "Techniques of Efficient XML Meta-Data Query Using an XML Table Index."

FIELD OF THE INVENTION

The present invention relates to efficiently accessing data from XML documents in a relational database.

BACKGROUND

XML

Extensible Markup Language (XML) is a World Wide Web Consortium (W3C) standard for representing data. Many applications are designed to output data in the form of XML documents. Various techniques may be used to store data from such XML documents into a relational database.

XML data comprises structured data items that form a hierarchy. In XML, data items known as elements are delimited by an opening tag and a closing tag. An element may also comprise attributes, which are specified in the opening tag of the element. Text between the tags of an element may represent any sort of data value, such as a string, date, or integer. An element may have one or more children. The resulting hierarchical structure of XML-formatted data is discussed in terms akin to those used to discuss a family tree. For example, a sub-element is said to descend from its parent element or any element from which its parent descended. A parent element is said to be an ancestor element of any sub-element of itself or of one of its descendant element. Collectively, an element along with its attributes and descendants, are referred to as a tree or a sub-tree.

XML data may be stored in relational databases using object relational storage or binary XML BLOB storage or CLOB storage because such databases are very efficient at manipulating data. However, while it may be efficient to search object relational storage or binary XML storage down the XML hierarchy from parent to child, these storage structures are not well suited for performing hierarchical navigation that requires traversing ancestor links up the hierarchy or sibling traversal.

Storage and Querying Systems for XML

Various types of storage mechanisms are used to store an XML document. XML documents may be stored in a relational database by shredding the document into individual elements and storing the elements in individual columns of a table. In a database server, an XML document may be stored in a row of a table, and nodes of the XML document may be stored in separate columns in the row.

Alternatively, an entire XML document may be stored as a large object (LOB) in a column of a database table. The large object column may store a character large object (CLOB) stored as text or instead may be stored as a binary large object (BLOB). The binary object may comprise a tokenized stream of XML data. Such a tokenized stream for an XML document may alternatively be stored in volatile memory.

XML Query and XPath

It is important for database systems that store XML data to be able to execute queries using XML query languages. XML Query Language (XQuery) and XML Path Language (XPath) are important standards for a query language, which can be used in conjunction with SQL to express a large variety of useful queries. XPath is described in XML Path Language (XPath), version 1.0 (W3C Recommendation 16 Nov. 1999), herein incorporated by reference and available at the time of writing at http://www.w3.org/TR/xpath, as well as in XML Path Language (XPath) 2.0 (W3C Recommendation 23 Jan. 2007), herein incorporated by reference and available at the time of writing at http://www.w3.org/TR/xpath. XQuery is described in XQuery 1.0: An XML Query Language (W3C Recommendation 23 Jan. 2007), herein incorporated by reference and available at the time of writing at http://www.w3.org/TR/xquery. Also, there is an XQuery scripting language: http://www.w3.org/TR/xquery-sx-10/.

Path Expressions

Figure 1A:
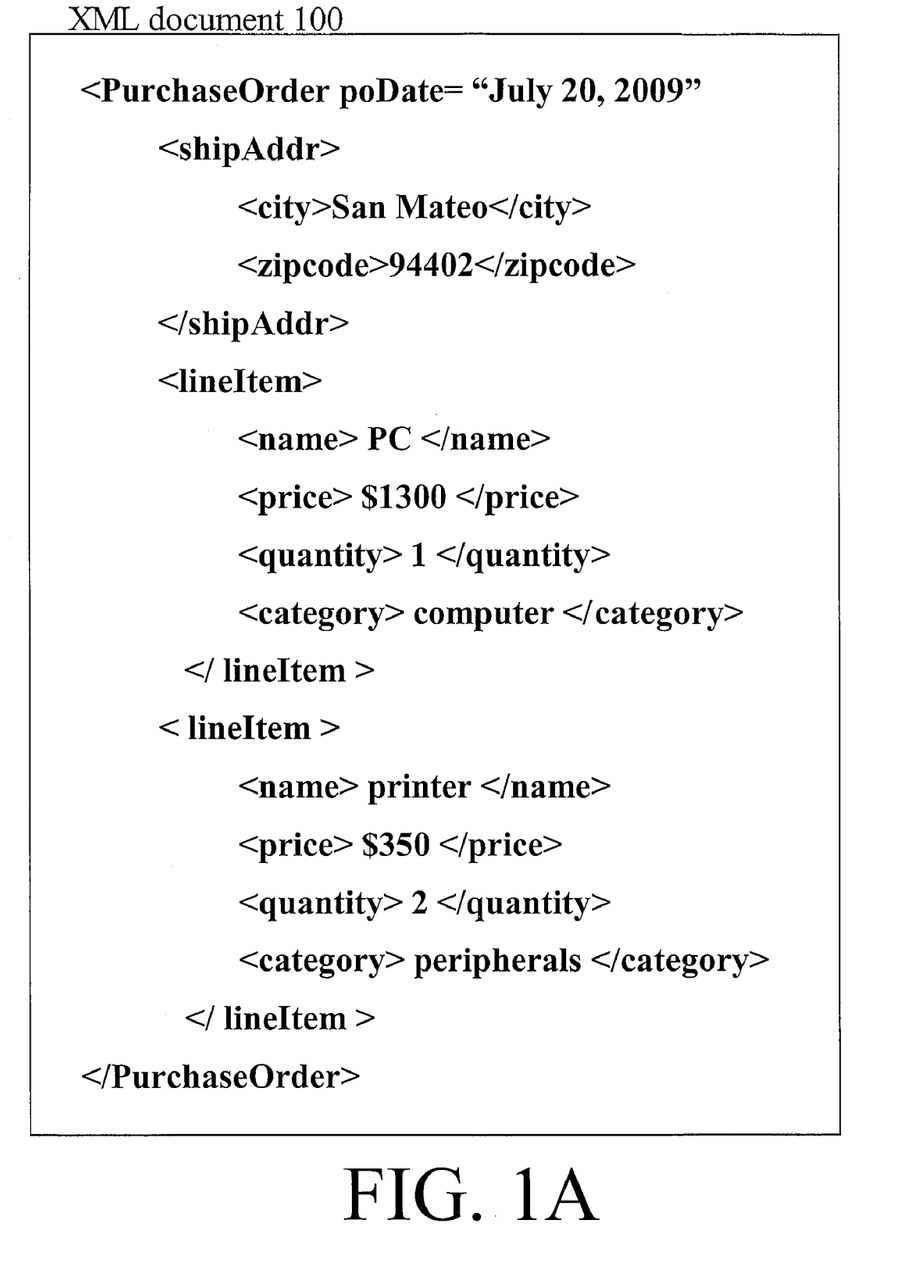
FIG. 1A is an example XML document.

The structure of an XML document establishes parent-child relationships between the nodes within the XML document. The "path" for a node in an XML document reflects the series of parent-child links, starting from a "root" node, to arrive at the particular node. For example, the path to the "price" node in the example XML document 100 shown in FIG. 1A is /PurchaseOrder/lineItem/price, since the "price" node is a child of the "lineItem" node, and the "lineItem" node is a child of the "PurchaseOrder" node.

A path expression is evaluated relative to a particular node called the "context" which is the starting point for the navigation. Navigation is specified using the path axes (".", "/", "//", and " ... "). Each of these axes selects one or more nodes which are then further filtered based on what name test or node test followed the axis.

The current context axis "." selects the current context node. The child axis (/) selects the list of children nodes of the context, while the descendant axis (//) selects the list of all descendents of the context node. In effect, // can be considered a substitute for one or more levels of hierarchy. The parent axis ( ... ) selects the immediate parent of the context node. The name test or node test is used for further filtering of the set of nodes following the axis. Only the nodes which pass the name or node test are added to the results of the path evaluation. A wildcard character ("*") matches all element nodes. The axis may change the navigation direction as each path step is performed.

By stringing path axes and name/node tests together, users can traverse the document tree. If the result from evaluating the previous XPath step includes more than one node, then the next XPath step is evaluated once for each node in the result set, using one result set node at a time as context node.

A subset of XPath axis and name/node tests includes:

| | |
|---|---|
| / | Child axis |
| // | Descendent axis |
| . | Current axis |
| .. | Parent axis |
| * | Wildcard name test |

The syntax used herein is standard XPath syntax. However, it should be appreciated that any syntax having equivalent semantics as the above axes may be used.

Here are some examples of evaluating path expressions on the example XML Document 100.

./shipAddr/city finds all city elements within a shipAddr element. The children nodes of the current context are found whose name is "shipAddr". The children of those "shipAddr" elements whose name is "city" are found next. Thus, if the context is the "/PurchaseOrder" node, the result of evaluating the path expression is {/PurchaseOrder/shipAddr/city}

PurchaseOrder//category/* finds all category elements one or more levels deep in the PurchaseOrder hierarchy (arbitrary descendants). For example, in the context of the root node, the results would be {/PurchaseOrder/lineItem/category/computer, /PurchaseOrder/lineItem/category/peripherals}.

PurchaseOrder/*/category/* finds all category elements that are grandchildren (i.e. there is exactly one level between PurchaseOrder and category) of PurchaseOrder elements, unlike in the previous example in which any number of hierarchical levels may intervene. However, in this particular example, the results are the same.

./..

finds die parent element of the current context. If the current context is "/PurchaseOrder/shipAddr/zipcode", then evaluating "./.." results in {/PurchaseOrder/shipAddr"}.

Descending in the tree from parent to child is called forward navigation. Ascending up the hierarchy from child to parent is referred to as backward navigation. Paths that start with slash ("/") are evaluated starting at the root node of the hierarchy.

Navigating XML Data

When the XML data is stored as binary XML, such as a SAX stream token sequence, in order to navigate forward, the tokens have to be read sequentially until the desired node is found. There is no random access within the document for navigating directly to a child node without reading and skipping all the previous descendants. Finding a parent or ancestor node requires processing the sequence from the beginning of the sequence because parents and ancestors appear before the current node in the sequence. Finding a sibling node depends on whether the sibling appears before or after the current node in sequence. Although ancestors and siblings may be identified by following forward links in this way, multiple passes through the document may be required.

The XPath/XQuery languages support the operations that can be performed on a tree. However, storing XML data as described above and indexing the data may not provide for efficient navigation of tree-traversal. To overcome this problem, an in-memory document object model (DOM) may be created, and the navigation operations may be performed on the DOM. One problem with this approach is that the entire DOM tree may be constructed in memory before the tree traversal can be performed, even if only a few nodes out of the entire tree are needed to evaluate an expression. For a large document, this presents a scalability issue both in terms of time to build the tree and the amount of memory required to process an XPath expression. Building an in-memory DOM may require ten times as much space as the size of the XML document that the DOM represents. Thus, a 100 MB document may require a gigabyte of memory to hold the DOM tree.

To avoid the above-mentioned problems with constructing a DOM in volatile memory, another approach is to store the navigation links of the hierarchy persistently together with the XML content. In other words, the XML data may be stored as a tree on disc, with each node of the hierarchy storing both content and navigation links. Each node of the hierarchy may contain links providing random access to other nodes in the hierarchy. However, such an approach may require that the navigation links that support accessing ancestors, siblings, and children be stored interleaved with the content of each node.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

There are several approaches to storing XML data in a relational database. Choosing an optimal approach depends on the amount of structure in the data and the common access patterns of the data. A document that conforms to a schema that is registered with the database system may be shredded and the document's element values stored in a relational table where relational operations may be performed efficiently on the data. A semi-structured document may have certain values shredded and stored directly in a relational table while other values are stored as fragments that are stored as a CLOB or binary data (BLOB) within a column, where additional processing is necessary to extract values from within the fragment. For highly unstructured data, the entire document may be stored as a single CLOB or binary data in a base table, with primary and secondary indexes and views built to enhance the performance of retrieving certain frequently accessed data within the document. Database systems storing XML documents must efficiently support performing searches unstructured content.

Figure 1B:
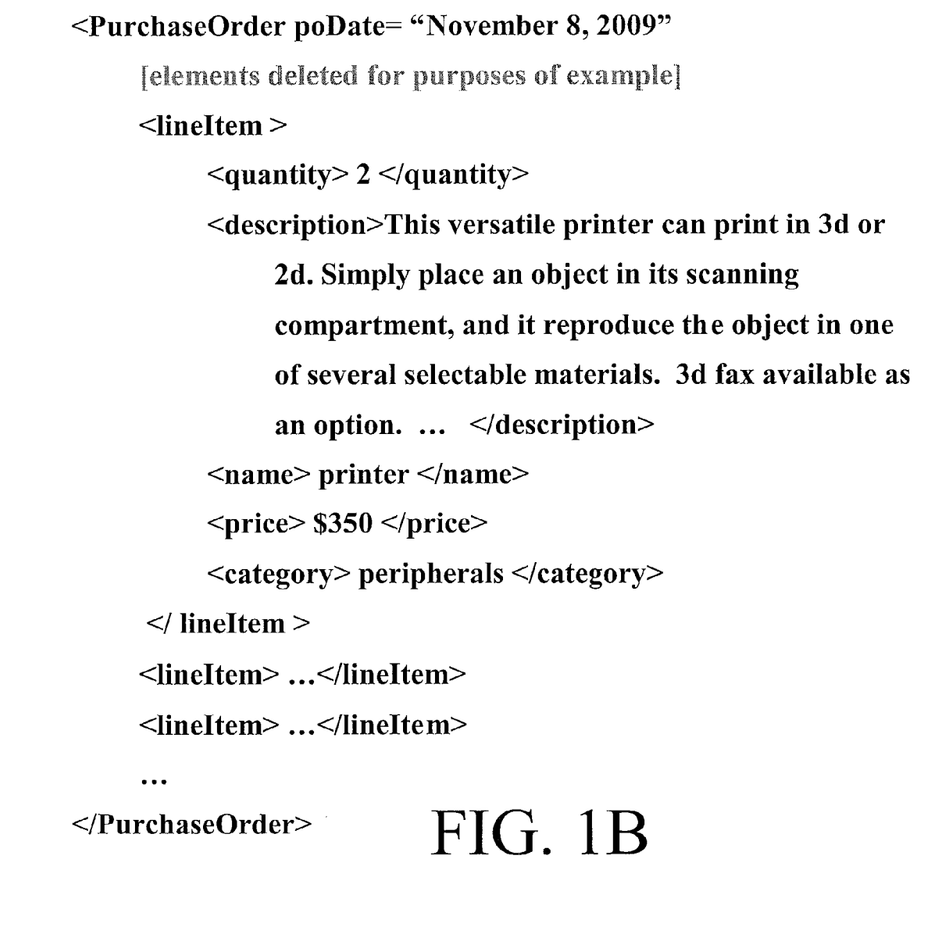
FIG. 1B is a purchase order XML document similar to that shown in FIG. 1A, but has been constructed to simplify the examples that depend on FIG. 1B.
Figure 2:
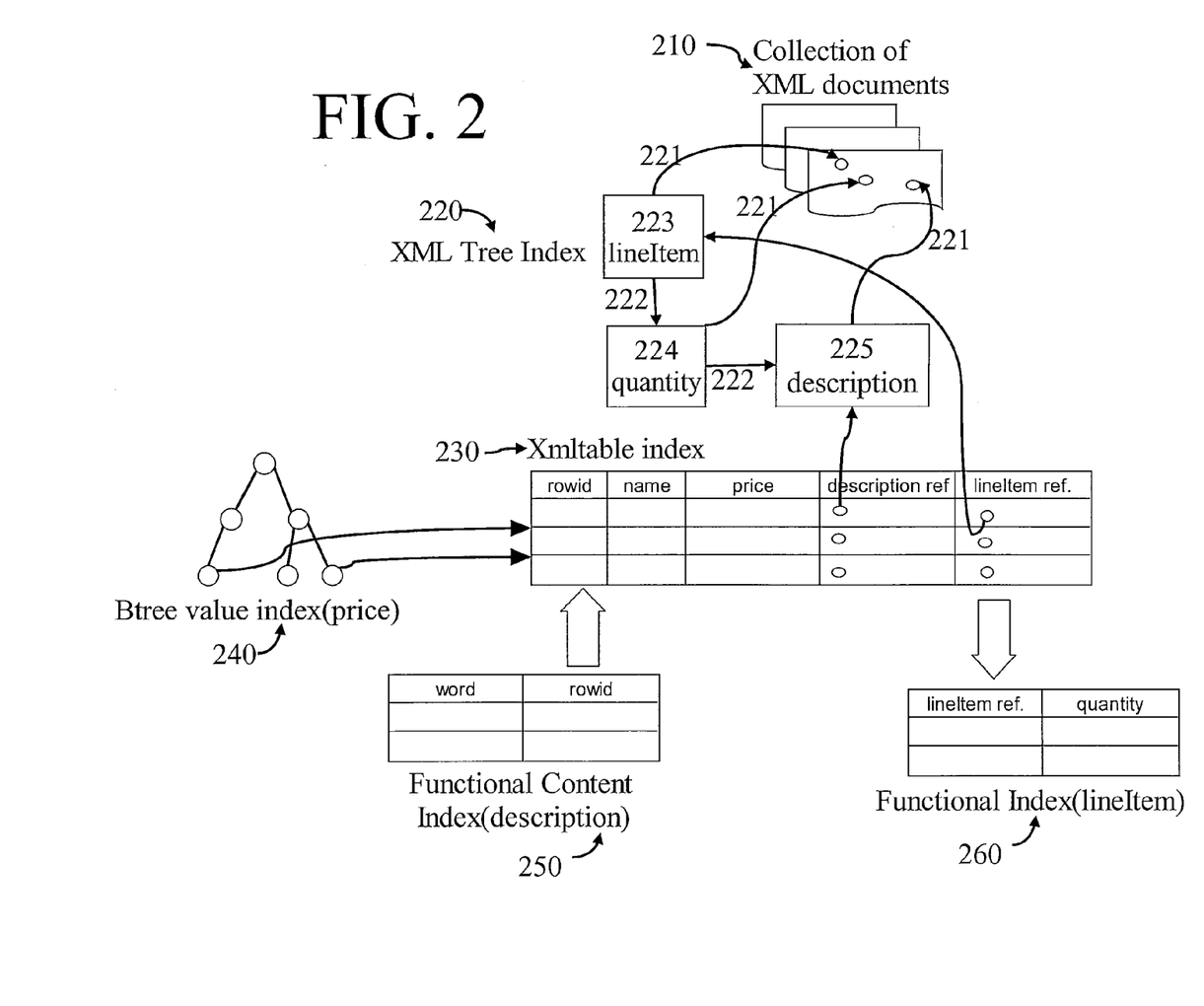
FIG. 2 is a diagram showing an overview of indexing structures using references addresses to support queries according to an embodiment of the invention.

FIG. 2 shows an overview of indexing structures that may be used over a collection of XML documents 210. As an example, the collection of documents may be a set of purchase orders whose structure is shown in the example of FIG. 1B. Each document in the collection of documents may have a corresponding XML tree index 220 that contains entries in one-to-one correspondence with nodes in the document. A short-hand way to refer to an XML tree index entry that corresponds to a certain node of the document is to refer to the XML tree index entry as the node tree index entry, the node's tree index entry, or the tree index entry of the node. Each XML tree index entry contains a reference address into location of the XML document where the content of its corresponding node is stored (221). A reference address into the location of an XML document where specific content is stored may also be referred to as a "LOB locator." An XML tree index entry (hereinafter "tree index entry") also contains reference addresses to other tree index entries (222). "De-referencing a reference address" means that a reference address is used to determine the location of the storage address that the reference address represents. A reference address may refer to a tree index entry or content within a node in a document. Reference addresses contained within a tree index entry and used for navigation are called "navigation links." A tree index entry corresponds to a given node. Navigation is the process of "traversing a navigation link" to determine the storage location of another (target) node that is in a hierarchical relationship with the given node. Traversing a navigation link may be accomplished by de-referencing a reference address that is a navigation link to locate the storage address of the tree index entry of the target node.

The XML tree index entry is similar to a DOM tree in that the index supports navigation of an XML hierarchy in all axes, but there are several differences between an XML tree index and a DOM. The XML tree index stores persistent addresses, whereas the DOM is an in-memory structure. Even if a DOM may be implemented persistently, a node of the DOM contains both links and content. The XML tree index is an index stored separately from the content of the document. Navigation of the XML document hierarchy can be performed given a tree index entry corresponding to the context node. For example, given the tree index entry for lineItem (223) (that is, the index entry corresponding to the lineItem node of the document), a reference address to the tree index entry corresponding to the child node for "quantity" (224) may be used to perform descendent navigation. Once at the tree index entry for "quantity," a reference address to within the document allows retrieving the value for the quantity within the lineItem fragment. Alternatively, from the tree index entry corresponding to the quantity node, a sibling reference address may be used to locate the description tree index entry within the lineItem fragment. The content reference address within the description tree index entry may locate the textual description (225) within the document.

A structured index table, referred to herein as an "xmltable index," may be built to index the collection of XML documents. In the example, the xmltable index 230 is constructed to contain a row id, name, price, description reference, and lineItem reference for each lineItem fragment of all XML documents in the collection. For a particular lineItem, the value of the price element is extracted at table construction time and stored in the column of the table. However, instead of storing the entire textual description which might be very long, a reference address to the description tree index entry within the lineItem fragment is stored in the index. Similarly, the reference address to the tree index entry corresponding to the lineItem node is stored in the table. Thus, a reference address to a tree index entry rather than a LOB locator may be stored in the xmltable index.

From the xmltable index, a set of secondary indexes may be constructed. A tree value index 240 may be constructed on the price column. However, function indexes may also be created where the underlying function is implemented to traverse the XML tree index navigation links. For example, a functional content index 250 can be built based on the description column of the xmltable index 230. When the content index is generated, the function uses the description reference address in the xmltable index to locate the textual description within the document, as described above, and indexes the xmltable index based on the words contained within the description. This kind of index may be used to evaluate a predicate such as "contains foo" where "foo" is a word in the index. Evaluating "contains foo" would produce the set of xmltable index rows having a description where the word "foo" appears.

Another example of an index that may be constructed is a function index on a complex item such as lineItem (260). Such an index may allow for the retrieval of other values contained within the complex element, but not stored in the xmltable index. For example, from the lineItem node, the value of quantity may be extracted. Once rows in the xmltable index are identified as having a lineItem of interest, the function index 260 may be used to quickly extract the quantity value from the lineItem. When the function index is created, the reference addresses in the lineItem ref column of the xmltable index are used to locate the corresponding tree index entry (223). The tree index entry is used to navigate to the tree index entry corresponding to quantity (224), and the content reference address is used to retrieve the value of quantity from the XML document, as described above.

Using the Indexes

Figure 3:
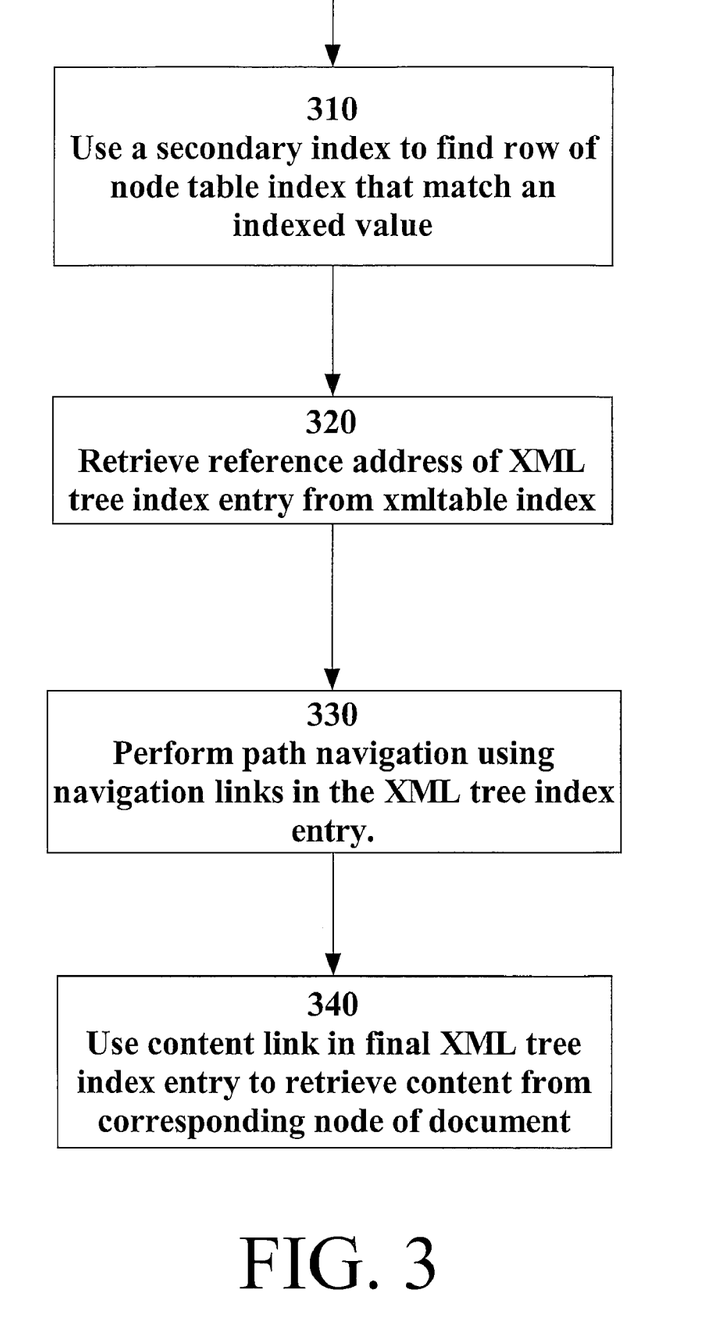
FIG. 3 is a flow diagram showing the high level flow for utilizing various indexes shown in FIG. 2.

FIG. 3 shows one embodiment of a high level flow for utilizing the indexes as shown in FIG. 2. In Step 310, a secondary index may be used to find rows of the xmltable index corresponding to a set of particular nodes in the document. The set of particular nodes in the document may be specified in a path expression. In Step 320, the reference address for a node is extracted from each of the rows of the xmltable index that were identified in Step 310. For each retrieved reference address, path navigation is performed using the navigation links (reference addresses) in the tree index entry in Step 330. Once the tree index entry of the XML node matching the path expression is reached, the LOB locator is used to retrieve the value of the node from the XML document in Step 340.

XML Tree Index

Each XML document may have its own separate XML tree index. An index may be generated and stored in response to a request to index a particular XML document. One index entry corresponds to exactly one node of the corresponding XML document. There are both navigation links and links to content stored in each index entry. A navigation link is a reference address to another index entry used for navigating the indexed document. A content link is a reference address to a location within the XML document content itself (a.k.a. LOB locator).

Figure 4:
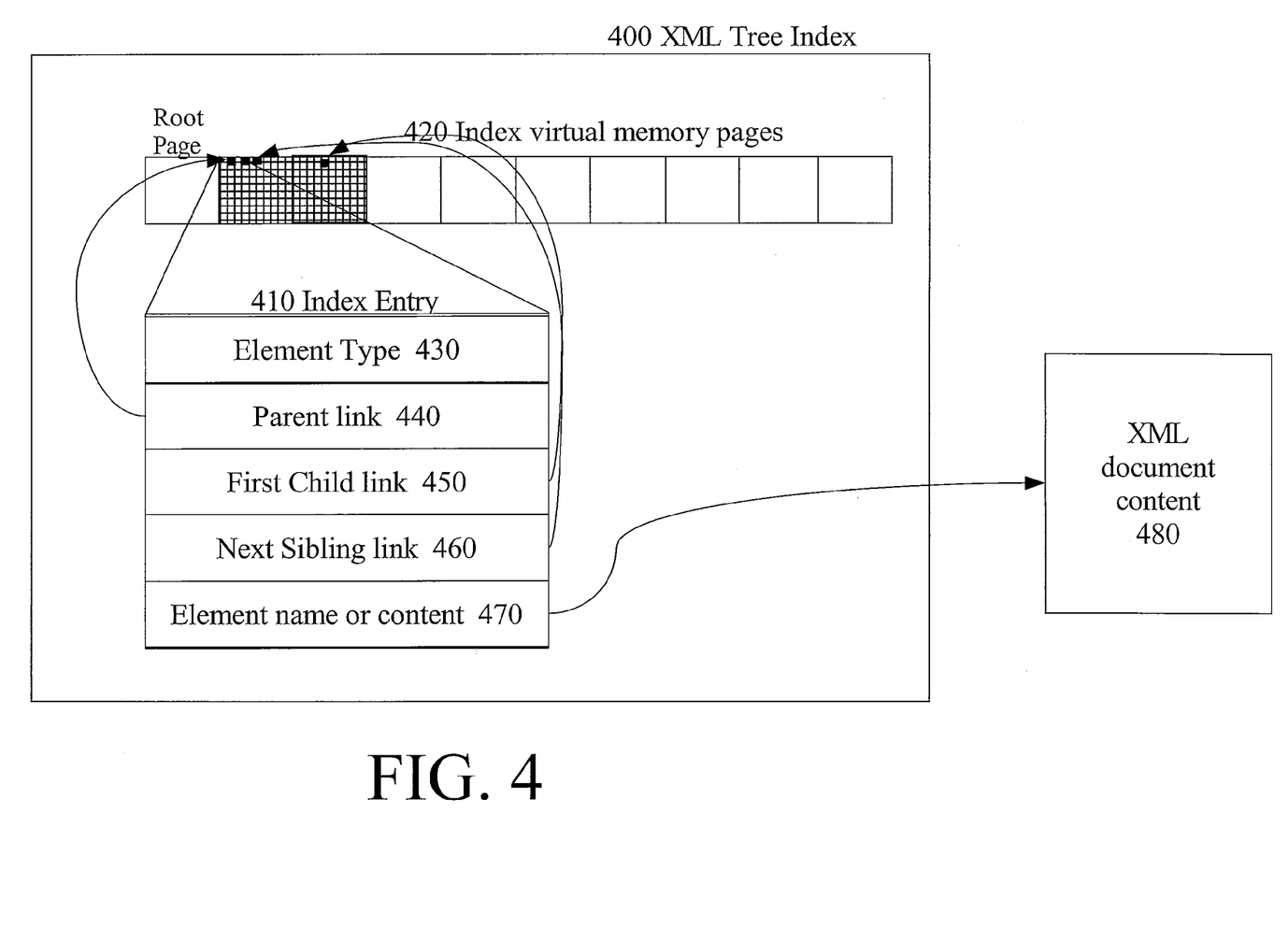
FIG. 4 is a diagram of an XML tree index entry node according to one embodiment of the invention.

Referring to FIG. 4, the XML tree index 400 is comprised of a set of contiguous, fixed-sized virtual memory segments 420. In one embodiment, a memory segment is a page of virtual memory. Each virtual memory segment of the XML tree index is divided into a set of fixed-sized index entries. An Index Entry 410 is comprised of the following information: element type, parent link, first child link, next sibling link, and a link into the XML content that either contains the element name or the element value if the element is a leaf node. Element Type 430 indicates the type of node that corresponds to the index entry and may be, for example, an element, attribute, text, comment, or processing instruction code. The arrows from the Parent Link 440, First Child Link 450, and Next Sibling Link 460 all point to other index entries within the XML tree index. The other index entries may reside in the same page or a different page as the index entry containing the links. Element name link or element content link 470 points to a location within the XML content itself. The location within the document may comprise a document offset. The XML content may contain variable-sized data.

The reference address of an index entry may be expressed as a (Page number, offset number) tuple, where the offset number may also be referred to as the index entry number. However, the reference address may be identified in any way a virtual memory address may be expressed.

Example

FIG. 1B shows an abbreviated XML document for purposes of example. The document in FIG. 1B represents a purchase order for electronic equipment. Although a purchase order may contain a shipping address and multiple line items, only one line item is shown in this example to simplify the example diagrams. The approach is not so limited. The single line item shown in this example is for a printer, categorized as a peripheral, costing $350.00. Two of these printers were purchased. The description of the printer is a very long textual value.

Figure 5:
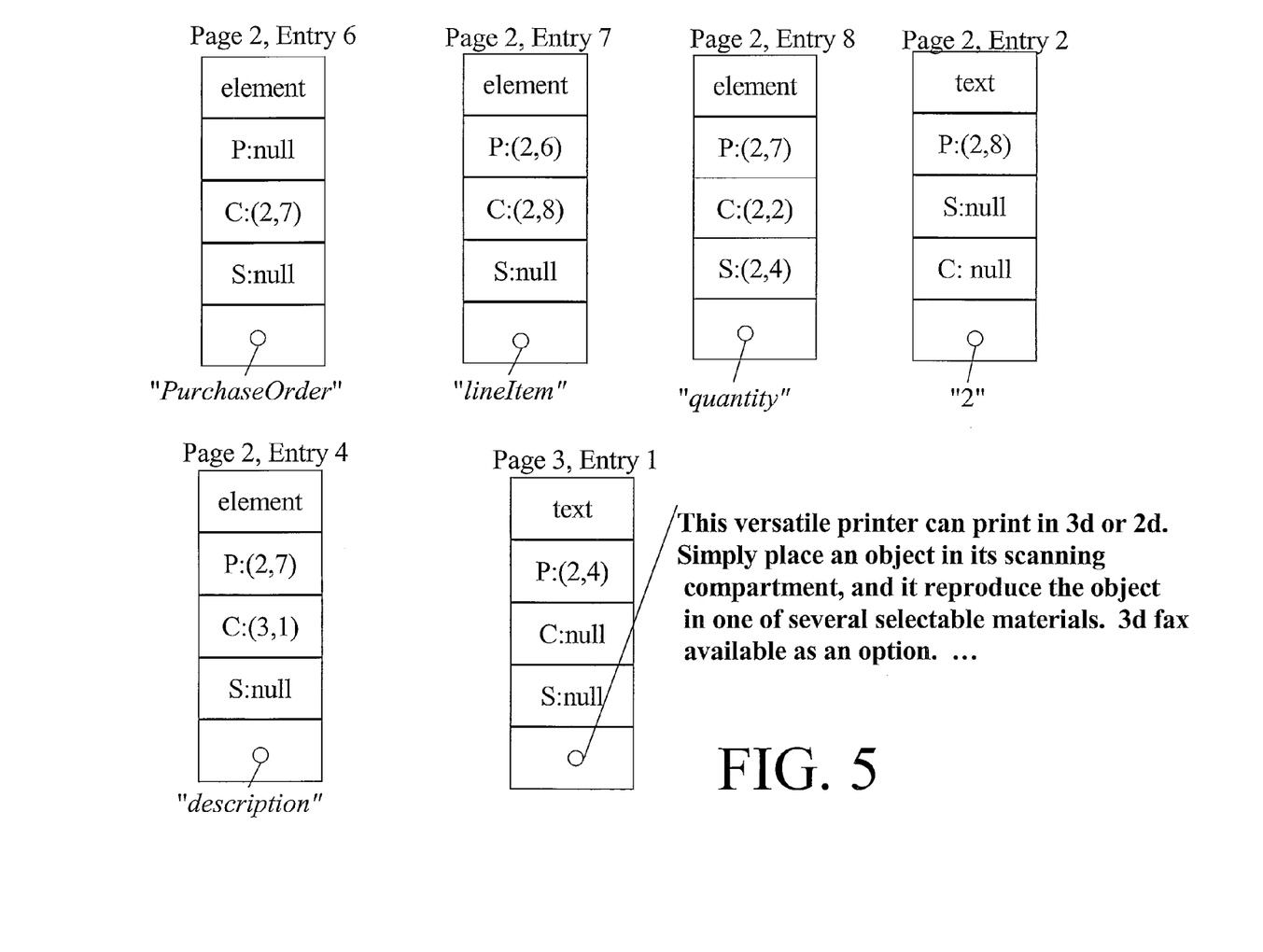
FIG. 5 is a diagram of example index entries for the example document in FIG. 1B according to an embodiment of the invention.

FIG. 5 shows a set of tree index entries corresponding to the nodes of the document shown in FIG. 1B. "P" is a short-hand designation for parent, indicating that the following address represents the tree index entry address of the parent node. For example, in the index entry at address (Page 2, Entry 6) [i.e. (2,6)], the parent index entry is null because this tree index entry corresponds to the "PurchaseOrder" node which is the root of the document, and the root node has no parent. The content link points to the text string "PurchaseOrder" in the XML document, and the type "element" indicates that "PurchaseOrder" represents the name of the element. "C" is an abbreviation for first child, indicating that the address is a reference address of a tree index entry of a child node. "S" is an abbreviation for first sibling. These abbreviations are used to clarify what each reference address represents, and need not be stored in each tree index entry element.

Tree index entry (2,6) references a first child address of (2,7) that represents the "lineItem" node. Tree index entry (2,7) references (2,6) as its parent. Tree index entry (2,7) references a first child at (2,8) that represents the "quantity" node in the corresponding XML document. "Quantity" is a leaf node and has a value. The value represented by tree index entry (2,2) which is the first child of the "quantity" tree index entry. The LOB locator containing the content address in (2,2) references the text string "2" which is the value of the corresponding "quantity" node.

Tree index entry (2,8) references (2,4) as its sibling node that represents the "description" node. Tree index entry (2,4) references a child tree index entry (3,1) that represents the value of the description. The content reference address locates the long textual description within the XML document.

Storing a Reference Address to a Tree Index Instead of a LOB Locator

A reference address points to a particular tree index entry, whereas a LOB Locator points directly into a node within an XML document. If the XML data is stored as character data, the LOB Locator may point to an offset within the document to the start of the sequence of characters representing the node. Having a LOB locator to an offset within a document does not provide the context of the node.

Performing descendent navigation with only a LOB locator as a starting point can be performed by scanning the character sequence to identify children of the node, but if there are many children nodes, many characters will have to be scanned to find the desired child node. A LOB locator does not even provide the ability to find the root of the document so that descendent navigation may be performed from the root. Even if support for finding the root of a document given an LOB locator were provided, performing descendent navigation from the root for every access may be very inefficient. Thus, although descendent navigation may be possible starting with a LOB locator, it may be inefficient.

In addition, starting with a LOB locator provides no support for ascendant or sibling navigation. Storing a reference address to a tree index entry instead of a LOB locator improves performance for navigation because parent, sibling, and children links are directly provided within the index entry. After using a reference address to navigate to the node of interest, a LOB locator stored in the corresponding tree index entry allows for retrieval of the content within the document.

Performing full axis navigation by dereferencing reference addresses stored within an XML tree index may be much less expensive than forward scanning through a character sequence or binary sequence of XML data.

Xmltable Index

Figure 6:
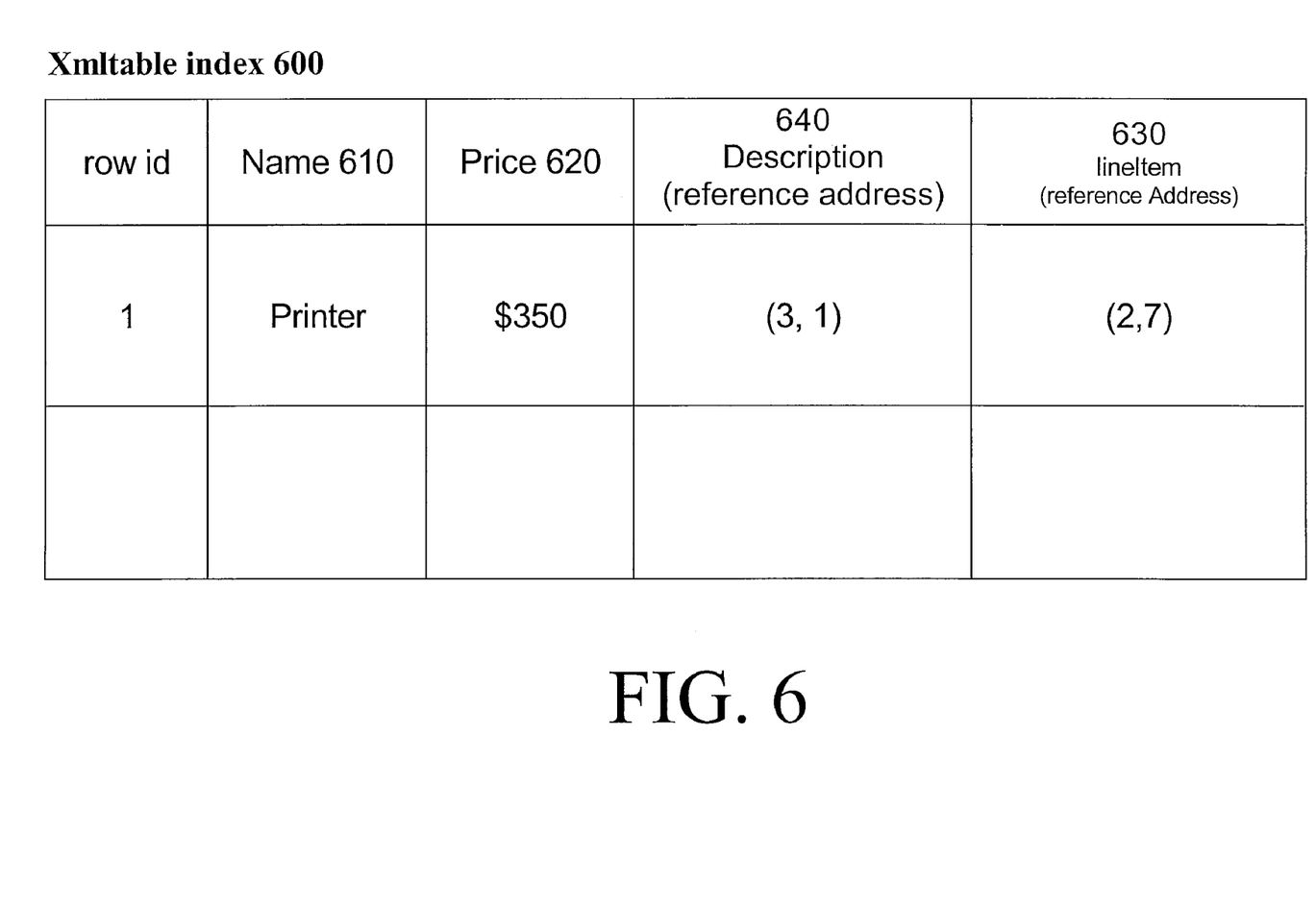
FIG. 6 is an example xmltable index that stores a reference address of a tree index entry shown in FIG. 4.

An xmltable index may be constructed that identifies individual nodes within an XML document. A node may be a complex element which represents a fragment of the XML document or a node may be a leaf node. Not only may this finer-grained index be more efficient for retrieving values by targeting a specific portion of a document, but the index also allows for a single document to contain a plurality of the same type of nodes. For example, if an xmltable index is constructed on a document similar to the example shown in FIG. 1B, but many more lineItems are included, the xmltable index may have a row for each lineItem node in the document. FIG. 6 shows one row of a node table 600 that corresponds to the lineItem node of the example XML document shown in FIG. 1B. If queries on the collection of XML data frequently use the values of name and price to filter the required lineItems, the values of the name and price may be retrieved from each lineItem node of each document at index creation time and stored within the Name 610 and Price 620 columns respectively. However, it might not be necessary to store the category or the quantity. Once the price and name are used to identify a set of nodes of interest, the reference address stored in the lineItem reference address 630 column may be used to retrieve the lineItem tree index entry corresponding to the lineItem node in the document and navigate to its category or quantity values as needed. In the example, the reference address stored in the lineItem fragment column is (Page 2, Entry 7) of the XML tree index. If a document contains multiple lineItem nodes, each such node would have a corresponding tree index entry representing it whose reference address would be stored in the node index.

For example, an XMLTable may be defined as follows:

```
XMLTable( //lineItem
    COLUMNS name VARCHAR PATH 'name',
            price NUMBER PATH 'price',
            description XMLREF PATH 'description',
            lineitem XMLREF PATH '.') NodeTable
```

In this example, each row of NodeTable corresponds to a lineItem entry in a purchase order in one of the documents. There may be multiple lineItem entries within the same purchase order, and thus there may be multiple rows of NodeTable that index the same XML document within the collection. NodeTable stores the value of the price and the name of the item directly in the table at the time the table is constructed.

The lineItem node and description nodes are each stored as a reference address in a column of an XML tree index. The reference addresses identify the XML Tree Index entry corresponding to the node of the document stored in the xmltable index. In this example, "XMLREF" is used to indicate that the column value is a reference address.

The set of XML documents are parsed, and each node is identified as its XML tree index is created. Thus, the XML tree index may be used for constructing the xmltable index. The path expression over which the xmltable index is created (e.g. //lineItem) may be navigated using the document's corresponding tree index. The tree index provides the ability to find the document's root tree index entry. From the root, descendent navigation can be performed to find nodes that match the path expression. For each match within a document, a new row of the xmltable index may be created, and the reference address of the tree index entry corresponding to a matched node may be stored in the xmltable index. In one embodiment, the reference address may be relative to the document's tree index entry, requiring a document locator or document id to be stored and used in conjunction with the reference address to determine an absolute virtual memory address for the tree index entry. In another embodiment, the reference address may include enough information to determine the absolute virtual memory address of the tree index entry.

Executing a query over a collection of XML documents may involve several steps. First, the predicate (WHERE clause) is evaluated to identify the set of xmltable index rows that satisfy the predicate. The WHERE clause may include a path-based expression that requires navigation of a complex element. For example, perhaps only those lineItems corresponding to purchase orders placed after a certain date are of interest. The value of poDate is not in the xmltable index, so its value must be extracted from the document containing the lineItem of interest. Next, starting with the reference address of the particular lineItem's XML tree index entry, ascendant navigation can be performed to obtain the purchase order date for the lineItem. Thus, the predicate may be expressed as:

WHERE (../@poDate>"11/1/09")

In this example, the lineItem reference from the xmltable index is used as the context node for ascendant navigation necessary to retrieve a value when evaluating the predicate of a query. Once the rows that satisfy the predicate are identified, the values that match a path-based expression specified in the SELECT clause of the query are retrieved. Just as in the WHERE clause, the path-based expression in the SELECT clause may specify navigation in any axis.

When an xmltable index is constructed, it is defined to store the reference address of at least one particular node of a document; however, a plurality of reference addresses may be stored as shown in FIG. 6 (630 and 640). In addition to an xmltable index storing a reference address of an XML tree index to identify a node of a complex element on which navigation may be performed, a value index may be built on NodeTable that stores a reference address to a tree index entry that contains the reference address to the desired value within the document. Storing a reference address rather than a value may be advantageous when the value is too large to store directly in the value index.

Function Index

Reference addresses may also be stored in place of a scalar value when the scalar value is too large for SQL types. For example, the description element in the purchase order example may be too large to efficiently store directly in the node table, so a reference to its XML tree index address may be stored instead. Storing the reference address saves space over copying a very large textual value. Also, a secondary function index may be built on the description reference address column that allows full text search of the content. The function associated with such a secondary index de-references the reference addresses to extract the value of the text description. For this example, the reference address of the description node is used to evaluate the predicate (WHERE clause) and identify the rows of the xmltable index which satisfy the conditions placed of the value of the description as specified in the predicate. For example, if all products on lineItems that mention supporting 3d are requested, the query might look like:

```
SELECT ./name FROM NodeTable
WHERE ./description contains ("3d")
```

Value Index

A secondary value index may be created on the xmltable index over values that are not directly stored in the xmltable index. For example, a value index may be created on the value of the category node within each lineItem node. When the value index is created, each row of the xmltable index is processed by retrieving the reference address to the lineItem node, using it to navigate to the quantity node, retrieving the value of the quantity node using the LOB locator in the tree index entry for quantity, and storing the retrieved value in the value index. When processing a query, the rows of the xmltable index satisfying the predicate will be processed by extracting their lineItem reference addresses and using each of them to look up the pre-computed quantity value in the secondary index. For example, a value index may be a function index defined as:

CREATE INDEX QuantityIndex ON NodeTable (GetQuantity(lineItem)) GetQuantity is a user-supplied function that retrieves the value of quantity from the lineItem element. Once defined, a query may use the function index to more quickly retrieve the value of quantity as follows:

```
SELECT quantity FROM //lineItem/quantity
WHERE price>$300.00 and name="Printer"
```

In this example, the value of the lineItem quantity will be retrieved for all xmltable index rows corresponding to a line item of the purchase order for printers costing more than $300.00.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
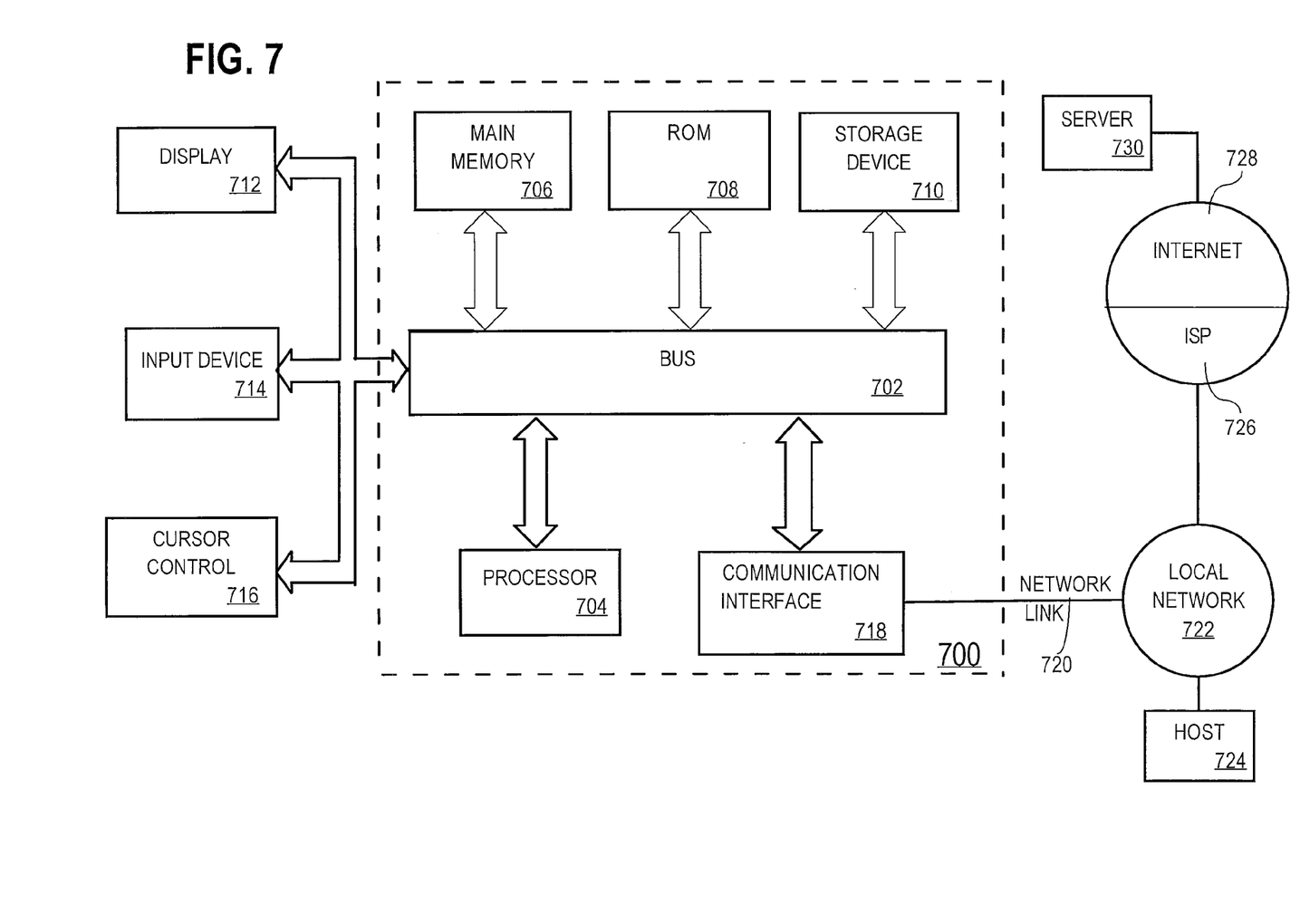
FIG. 7 is a diagram of a computer system on which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
a database server storing persistently in a database an XML tree index that indexes a corresponding XML document of a collection of XML documents stored in said database, wherein each XML tree index comprises a set of XML tree index entries, each XML tree index entry of the set of XML tree index entries having a one-to-one correspondence with a node of said corresponding XML document;
said database server storing a node index on nodes of said collection of XML documents, wherein each row of said node index contains a document identifier of a particular XML document and a reference address to a particular XML tree index entry, wherein said particular XML tree index entry corresponds to a particular node in said particular XML document;
said particular XML tree index entry containing another reference address to another XML tree index entry corresponding to an ascendant node of said particular node;
based on said reference address, performing ascendant node navigation from said particular node.

2. The method of claim 1, wherein said particular node is a leaf node element, and said node index further stores a second reference address that corresponds to a value of said particular node.

3. The method of claim 2, further comprising:
creating a function index on said node index, wherein a function associated with said function index obtains, based on said second reference address, the value of said particular node.

4. The method of claim 1, wherein said particular node is a complex node element.

5. The method of claim 4, wherein the XML tree index further stores a second reference address corresponding to one of:
a) a parent node of said particular node;
b) a sibling node of said particular node; or
c) a child node of said particular node.

6. The method of claim 4, further comprising
creating a function index on said node index, wherein a function associated with the function index evaluates, based on said reference address, a path-based expression starting at said particular node; and
wherein creating the function index further comprises evaluating said path-based expression starting at said reference address, wherein evaluating said path-based expression includes performing full axis navigation in context of said particular node.

7. A computer-implemented method comprising:
a database server storing persistently in a database an XML tree index that indexes a corresponding XML document of a collection of XML documents stored in said database, wherein each XML tree index comprises a set of XML tree index entries, each XML tree index entry of the set of XML tree index entries having a one-to-one correspondence with a node of said corresponding XML document;
said database server storing a node index on nodes of said collection of XML documents, wherein each row of said node index contains a document identifier of a respective XML document and a reference address to a respective XML tree index entry, wherein said respective XML tree index entry corresponds to a respective node in said respective XML document;
said respective XML tree index entry containing reference addresses to a set of other XML tree index entries, wherein each XML tree index entry of the set of other XML tree index entries corresponds to:
a) a root node of said respective node;
b) a parent node of said respective node;
c) a sibling node of said respective node; or
d) a child node of said respective node.

8. The method of claim 7, wherein a function index on a reference address column of said node index is used for retrieving content from a node of a given XML document, wherein a function associated with the function index performs path navigation to identify an XML tree index entry that corresponds to said given node of said given XML document;
wherein navigation is performed starting at an XML tree index entry identified by a particular reference address stored in said reference address column of said node index;
wherein content is retrieved based on a content link of said particular XML tree index entry that was identified as a result of performing the navigation.

9. The method of claim 8, wherein a first index entry identified by said particular reference address corresponds to a first node of said given XML document;

wherein said first index entry includes a parent reference address that identifies a second index entry;

wherein said second index entry corresponds to a parent node of said first node;

performing said ascendant navigation using the parent reference address in the first node to identify the parent node.

10. A non-transitory computer-readable storage medium storing one or more instructions which, when executed by one or more processors, cause the one or more processors to perform:

a database server storing persistently in a database an XML tree index that indexes a corresponding XML document of a collection of XML documents stored in said database, wherein each XML tree index comprises a set of XML tree index entries, each XML tree index entry of the set of XML tree index entries having a one-to-one correspondence with a node of said corresponding XML document;

said database server storing a node index on nodes of said collection of XML documents, wherein each row of said node index contains a document identifier of a particular XML document and a reference address to a particular XML tree index entry, wherein said particular XML tree index entry corresponds to a particular node in said particular XML document;

said particular XML tree index entry containing another reference address to another XML tree index entry corresponding to an ascendant node of said particular node;

based on said reference address, performing ascendant node navigation from said particular node.

11. The non-transitory computer-readable storage medium of claim 10, wherein said particular node is a leaf node element, and said node index further stores a second reference address that corresponds to a value of said particular node.

12. The non-transitory computer-readable storage medium of claim 11, further comprising instructions which, when executed, cause the one or more processors to perform:

creating a function index on said node index, wherein a function associated with said function index obtains, based on said second reference address, the value of said particular node.

13. The non-transitory computer-readable storage medium of claim 10, wherein said particular node is a complex node element.

14. The non-transitory computer-readable storage medium of claim 13, wherein the XML tree index further stores a second reference address corresponding to one of:

a) a parent node of said particular node;
b) a sibling node of said particular node; or
c) a child node of said particular node.

15. The non-transitory computer-readable storage medium of claim 13, further comprising instructions which, when executed, cause the one or more processors to perform:

creating a function index on said node index, wherein a function associated with the function index evaluates, based on said reference address, a path-based expression starting at said particular node; and wherein creating the function index further comprises evaluating said path-based expression starting at said reference address, wherein evaluating said path-based expression includes performing full axis navigation in context of said particular node.

16. A non-transitory computer-readable storage medium storing one or more instructions which, when executed by one or more processors, cause the one or more processors to perform:

a database server storing persistently in a database an XML tree index that indexes a corresponding XML document of a collection of XML documents stored in said database, wherein each XML tree index comprises a set of XML tree index entries, each XML tree index entry of the set of XML tree index entries having a one-to-one correspondence with a node of said corresponding XML document;

said database server storing a node index on nodes of said collection of XML documents, wherein each row of said node index contains a document identifier of a respective XML document and a reference address to a respective XML tree index entry, wherein said respective XML tree index entry corresponds to a respective node in said respective XML document;

said respective XML tree index entry containing reference addresses to a set of other XML tree index entries, wherein each XML tree index entry of the set of other XML tree index entries corresponds to:

a) a root node of said respective node;
b) a parent node of said respective node;
c) a sibling node of said respective node; or
d) a child node of said respective node.

17. The non-transitory computer-readable storage medium of claim 16, wherein a function index on a reference address column of said node index is used for retrieving content from a node of a given XML document;

wherein a function associated with the function index performs path navigation to identify an XML tree index entry that corresponds to said given node of said given XML document;

wherein navigation is performed starting at an XML tree index entry identified by a particular reference address stored in said reference address column of said node index;

wherein content is retrieved based on a content link of said particular XML tree index entry that was identified as a result of performing the navigation.

18. The non-transitory computer-readable storage medium of claim 17, wherein a first index entry identified by said particular reference address corresponds to a first node of said given XML document;

wherein said first index entry includes a parent reference address that identifies a second index entry; wherein said second index entry corresponds to a parent node of said first node;

performing said ascendant navigation using the parent reference address in the first node to identify the parent node.

* * * * *

UNITED STATES PATENT AND TRADEMARK OFFICE
CERTIFICATE OF CORRECTION

PATENT NO. : 8,346,813 B2
APPLICATION NO. : 12/690820
DATED : January 1, 2013
INVENTOR(S) : Beda Christoph Hammerschmidt et al.

Page 1 of 1

It is certified that error appears in the above-identified patent and that said Letters Patent is hereby corrected as shown below:

In the claims:

COLUMN 14

Claim 8 line 54 delete "claim 7" insert -- claim 1 --

COLUMN 14

Claim 8 line 59 delete "said" insert -- a -- between to and given

COLUMN 16

Claim 17 line 40 delete "said" insert -- a -- between to and given

COLUMN 16

Claim 18 line 58 insert -- further comprising instructions which, when executed, cause the one or more processors to perform -- between ; and an

COLUMN 16

Claim 18 line 58 delete ": performing" between ; and said

COLUMN 16

Claim 18 line 58 delete "said" insert -- an -- between perform and ascendant

Signed and Sealed this
Fifth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,346,813 B2
APPLICATION NO. : 12/690820
DATED : January 1, 2013
INVENTOR(S) : Hammerschmidt et al.

Page 1 of 1

It is certified that error appears in the above-identified patent and that said Letters Patent is hereby corrected as shown below:

Title Page 2, column 2, item (56) under Other Publication, insert
-- U.S. Appl. No. 12/871,869, filed Aug 30, 2012, Notice of Allowance, Oct 11, 2012 --.

In the Claims:

In column 14, line 19, in Claim 6, delete "comprising" and insert -- comprising: --, therefor.

Signed and Sealed this
Sixteenth Day of April, 2013

Teresa Stanek Rea
*Acting Director of the United States Patent and Trademark Office*